US010057030B2

(12) United States Patent
Jöngren et al.

(10) Patent No.: US 10,057,030 B2
(45) Date of Patent: Aug. 21, 2018

(54) METHOD FOR ESTIMATING FREQUENCY OFFSET USING QUASI-CO-LOCATED REFERENCE SIGNALS

(71) Applicant: Telefonaktiebolaget L M Ericsson (publ), Stockholm (SE)

(72) Inventors: George Jöngren, Sundbyberg (SE); Thomas Nilsson, Malmö (SE); Haochuan Zhang, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 274 days.

(21) Appl. No.: 14/758,972

(22) PCT Filed: Jan. 3, 2014

(86) PCT No.: PCT/SE2014/050004
§ 371 (c)(1),
(2) Date: Jul. 2, 2015

(87) PCT Pub. No.: WO2014/107136
PCT Pub. Date: Jul. 10, 2014

(65) Prior Publication Data
US 2015/0341153 A1 Nov. 26, 2015

Related U.S. Application Data

(60) Provisional application No. 61/748,802, filed on Jan. 4, 2013, provisional application No. 61/751,289, filed on Jan. 11, 2013.

(51) Int. Cl.
*H04L 5/00* (2006.01)
*H04J 11/00* (2006.01)
(Continued)

(52) U.S. Cl.
CPC ........ *H04L 5/0051* (2013.01); *H04J 11/0079* (2013.01); *H04L 5/006* (2013.01);
(Continued)

(58) Field of Classification Search
CPC ... H04L 5/0051; H04L 5/0035; H04L 5/0007; H04L 5/006; H04W 56/0035; H04W 72/085; H04J 11/0079; H04J 2011/0096
(Continued)

(56) References Cited

U.S. PATENT DOCUMENTS 8,964,632 B2 * 2/2015 Sorrentino .......... H04L 25/0204
370/324
8,982,693 B2 * 3/2015 Krishnamurthy ..... H04W 52/50
370/216
(Continued)

OTHER PUBLICATIONS

3GPP, "Frequency error for Comp tests", 3GPP TSG RAN WG4 Meeting #66, R4-130521, St. Julian's, Malta, Jan. 28-Feb. 1, 2013, 1-39.
(Continued)

*Primary Examiner* — Man U Phan
(74) *Attorney, Agent, or Firm* — Sage Patent Group

(57) ABSTRACT

The present disclosure discloses a method used in a UE for estimating a frequency offset between a CRS of a serving cell of the UE and a DM-RS of a data transmission to be decoded by the UE, using a set of quasi-co-located reference signals. The method comprises: comparing a number of Resource Blocks, RBs, for the data transmission to a first threshold; selecting one or more quasi-co-located reference signals from the set of quasi-co-located reference signals based on a result of the comparison; and estimating the frequency offset based on the selected one or more quasi-co-located reference signals. The present disclosure also relates to a UE for estimating a frequency offset between a CRS of a serving cell of the UE and a DM-RS of a data
(Continued)

transmission to be decoded by the UE, using a set of quasi-co-located reference signals.

29 Claims, 11 Drawing Sheets

(51) Int. Cl.
 *H04W 72/08* (2009.01)
 *H04W 56/00* (2009.01)
(52) U.S. Cl.
 CPC .......... *H04L 5/0007* (2013.01); *H04L 5/0035* (2013.01); *H04W 56/0035* (2013.01); *H04W 72/085* (2013.01); *H04J 2011/0096* (2013.01)
(58) Field of Classification Search
 USPC .......... 370/252–312, 329–350; 709/221–229
 See application file for complete search history.

(56) References Cited

U.S. PATENT DOCUMENTS

| | | | | |
|---|---|---|---|---|
| 9,106,276 | B2* | 8/2015 | Sorrentino | H04B 7/024 |
| 9,119,209 | B2* | 8/2015 | Nam | H04W 72/046 |
| 9,198,070 | B2* | 11/2015 | Krishnamurthy | H04L 1/0026 |
| 9,215,694 | B2* | 12/2015 | Chen | H04W 72/04 |
| 9,264,195 | B2* | 2/2016 | Park | H04L 5/0094 |
| 9,295,051 | B2* | 3/2016 | Liu | H04L 5/0007 |
| 9,369,885 | B2* | 6/2016 | Bhattad | H04L 25/0202 |
| 9,491,750 | B2* | 11/2016 | Park | H04L 5/001 |
| 9,491,751 | B2* | 11/2016 | Park | H04L 5/001 |
| 9,554,371 | B2* | 1/2017 | Kim | H04B 7/26 |
| 9,735,933 | B2* | 8/2017 | Park | H04L 5/0035 |
| 9,768,898 | B2* | 9/2017 | Hwang | H04J 11/0053 |
| 2013/0279437 | A1* | 10/2013 | Ng | H04W 48/16 370/329 |
| 2014/0022988 | A1* | 1/2014 | Davydov | H04W 88/02 370/328 |
| 2014/0092827 | A1* | 4/2014 | Jongren | H04L 5/0053 370/329 |
| 2014/0301301 | A1* | 10/2014 | Cheng | H04L 5/0048 370/329 |
| 2015/0349855 | A1* | 12/2015 | Sesia | H04B 7/024 370/252 |
| 2015/0349940 | A1* | 12/2015 | Kim | H04J 11/0053 370/329 |
| 2016/0128037 | A1* | 5/2016 | Park | H04L 5/0094 370/312 |

OTHER PUBLICATIONS

3GPP, "Further discussion on quasi co-location of CSI-RS and CRS", 3GPP TSG-RAN WG1#71 meeting, R1-124913, New Orleans, USA, Nov. 16, 2012, 1-12.

3GPP, "Performance results for frequency error under non colocation assumptions", 3GPP TSG-RAN WG4 Meeting #65, R4-126655, New Orleans, Louisiana, USA, Nov. 12-16, 2012, 1-22.

3GPP, "Summary of CoMP QCL APs Session", 3GPP TSG RAN WG1 Meeting #71, R1-125371, New Orleans, USA, Nov. 12-16, 2012, 1-4.

Unknown, Author, "Discussion on frequency offset tracking for DL CoMP", Intel Corporation, 3GPP TSG-RAN WG1 #71, R1-124720, New Orleans, USA, Nov. 12-16, 2012, 1-6.

Unknown, Author, "Quasi co-location aspects between CRS, CSI-RS and DMRS for frequency synchronization", Huawei, HiSilicon, 3GPP TSG RAN WGI Meeting #71, R1-124689, New Orleans, USA, Nov. 12-16, 2012, 1-4.

Unknown, Author, "Remaining details of EPDCCH DM-RS quasi-co-location behaviour", ZTE, 3GPP TSG RAN WG1 Meeting #71, R1-124823, New Orleans, USA, Nov. 12-16, 2012, 1-2.

* cited by examiner

METHOD FOR ESTIMATING FREQUENCY OFFSET USING QUASI-CO-LOCATED REFERENCE SIGNALS

TECHNICAL FIELD

The present disclosure generally relates to radio communications, and particularly, to a method used in a User Equipment (UE) for estimating a frequency offset, and an associated UE.

BACKGROUND

When downlink Coordinated MultiPoint (DL CoMP) transmission is used, such as in a Long-Term Evolution (LTE) wireless communication network, downlink signals and channels received by a UE might come from different transmission points.

FIG. 1 illustrates a CoMP scenario, in which UE 3 and UE 1 are macro UEs, and are thus synchronized to a macro cell denoted as Macro eNB in terms of time and frequency via a Primary Synchronization Signal (PSS), Secondary Synchronization Signal (SSS), and/or Cell-Specific Reference Signals (CRS). However, UE 3 is decoding a signal sent by a pico cell denoted RRH1 (Remote Radio Head 1), such as a Physical Downlink Shared Channel (PDSCH) and/or an enhanced Physical Downlink Control Channel (ePDCCH). Since the macro cell is further away from the pico cell, UE 3 will observe a time difference between received signals. If there is some frequency difference between oscillators in the macro cell and the pico cell, or if UE 3 is moving in such a way that distances to the two transmitters are changing at different rates, then a phase ramp in the time and frequency domain is created. The resultant phase ramp can severely degrade the demodulation performance of the receiver in this CoMP scenario. Although the pico cell is denoted as RRH1 in FIG. 1, it may be denoted as any other particular type or configuration of radio nodes in a wireless communication network.

To address this problem, related work has started in RAN1 and RAN4 working groups of the 3rd-Generation Partnership Project (3GPP), under a working topic named "quasi-colocation," where the term "quasi-colocation" refers to a situation where two transmitters may be deemed to be located at the same point (collocated), for purposes of evaluating a particular property of the signals transmitted from those transmitters. To be clear, two transmitters may be deemed to be quasi-colocated for one property, such as frequency shift, while not deemed to be quasi-colocated for another, such as delay spread. To date, RAN 1 has defined sets of reference signal ports that can be considered as quasi-colocated or not, while RAN 4 is continuing to investigate the impacts on receiver performance when the non-colocated/non-quasi-colocated assumption is considered.

For demodulation of PDSCH, Table 1 summarizes assumptions that may be applied, as agreed in RAN1 meeting #70.

TABLE 1

| Agreements from RAN1 meeting #70 for PDSCH | | |
|---|---|---|
| CRS | CSI-RS | PDSCH DMRS |
| May be assumed as quasi co-located wrt all long term channel properties {delay spread, rx power, frequency shift, Doppler spread, Received timing} within the serving cell. | Within a CSI-RS resource, CSI-RS ports may be assumed as quasi co-located wrt {delay spread, rx power, frequency shift, Doppler spread, Received timing}. Between CSI-RS resources CSI-RS ports shall not be assumed as quasi co-located wrt {delay spread, rx power, frequency shift, Doppler spread, Received timing}. | May be assumed as quasi co-located within a subframe wrt to {delay spread, rx power, frequency shift, Doppler spread, Received timing} |

| | CRS-RS | PDSCH DMRS | PSS/SSS |
|---|---|---|---|
| CRS | Behaviour A: CRS, CSI-RS and PDSCH DMRS may be assumed as quasi co-ocated wrt {frequency shift, Doppler spread, Received timing, delay spread} Behaviour B: CRS and CSI-RS shall not be assumed as quasi co-located wrt {frequency shift, Doppler spread, Received timing, delay spread} | Behaviour A: CRS, CSI-RS and PDSCH DMRS may be assumed as quasi co-located wrt {frequency shift, Doppler spread, Received timing, delay spread) Behaviour B: CRS and PDSCH DMS shall not be assumed as quasi co-located wrt {frequency shift, Doppler spread, Received timing, delay spread} | PSS/SSS and CRS ports for a serving cell may be assumed as quasi co-located wrt {frequency shift, Received timing}. |
| CSI-RS | | Behaviour A; CRS, CSI-RS and PDSCH DMRS may be assumed as quasi co-located wrt {frequency shift, Doppler spread, Received timing, delay spread} Behaviour B: PDSCH DMRS and a CSI-RS resource indicated by physical layer signaling may be assumed as quasi co-located wrt {frequency shift, Doppler spread, Received timing, delay spread} | |

As indicated by Table 1, the UE can be in either of two different states, Behavior A and Behavior B. For Behavior A, all reference signal (RS) ports may be assumed as quasi-colocated with one another, with respect to all properties (frequency shift, Doppler spread, received timing, and delay spread). For Behavior B, on the other hand, the UE may assume only that DeModulation-Reference Signal (DM-RS) is quasi-colocated with Channel-State Information Reference Signal (CSI-RS), and not with Cell-specific Reference Signal (CRS).

The notion that the UE may assume that an RS port A is quasi-colocated with an RS port B with respect to a channel property X means that the UE is allowed to use RS port A and B in any combination (e.g., only RS port A, only RS port B, or both together) to determine channel property X. Transmission modes 1-9, as defined by the LTE specifications, are all only using Behavior A.

Further agreements with respect to quasi-colocation were made in the RAN1 #71 meeting. It was agreed that whether transmission mode 10 uses Behavior A or Behavior B at a given time can be configurable, using Radio Resource Control (RRC) signaling. Further, the relation between CRS and CSI-RS was changed in Behavior B, so that CRS and CSI-RS may be assumed quasi-colocated with respect to Doppler shift and Doppler spread.

Summarizing the RAN1 #71 agreements:
For Behavior B:
  For each CSI-RS resource, the network shall indicate by RRC signaling that CSI-RS ports and CRS ports of a cell may be assumed as quasi co-located with respect to the following properties
  {Doppler shift, Doppler Spread}
  RRC signaling includes:
    Cell ID for quasi-colocated CRS
    Number of CRS ports
    Multicast-Broadcast Single Frequency Network (MBSFN) configuration
    Signaling details are left up to RAN2

Note that the notion of a Doppler shift includes all effects that create a frequency shift in the received signal. For example, if two transmission points have clocks that run at (slightly) different rates, that will be seen on the UE side as a Doppler shift between the received signals corresponding to the two points. Similar reasoning applies for when a transmission point and the UE are using clocks with different rates. The term "point" may be used in the description that follows to refer to a transmission point. Naturally, movement of the UE relative to the transmission points may also create a Doppler shift. Thus, both clock rate differences and UE mobility contribute to the overall Doppler shift seen on the UE side. In general, the description that follows refers to a frequency offset, without distinguishing between the cause or causes of the frequency offset, and it should be kept in mind that from a UE perspective this is the same thing as a Doppler shift.

More particularly, the description that follows focuses on the frequency offset between PSS/SSS/CRS ports and DM-RS ports, in an LTE system, and elaborates on the estimation of such a frequency offset. Before proceeding further, however, some background information about the frequency offset is introduced.

FIG. 2 illustrates frequency offset generation due to clock rate differences, and its impact on a subcarrier on the UE side.

As shown in FIG. 2, the UE on the right-hand side of the figure is synchronized in frequency to TP#0, but is decoding data/control channels sent by TP#1. A frequency difference of $\Delta f$ Hz exits between the two transmission points (TPs), due to slightly different clock rates. This frequency offset creates an extra and undesirable phase ramp (phase rotation) in the receiver after Fast-Fourier Transform (FFT), as illustrated in FIG. 2.

The resultant phase ramp in time caused by the frequency offset can severely impact the demodulation performance of CoMP.

To illustrate this, simulation results from a CoMP system is presented FIG. 3, where a DM-RS based PDSCH is transmitted from one point while the serving cell CRS is transmitted from another point with a different frequency offset. The simulations in FIG. 3, as well as all other simulations illustrated in the present disclosure, were carried out under the following assumptions: Frequency-Division Duplexing (FDD); 1 UE; two TPs; 10 MHz system bandwidth; Extended Pedestrian A (EPA) channel; 5-Hz Doppler; 2×2; Transmission Mode 9 (TM9); 2 CRS ports; 2 CSI-RS ports; 1 DM-RS port; 50 RB allocated to PDSCH; fixed Modulation and Coding Scheme (MCS) of 64 QAM at ¾ coding rate; and the UE and the two TPs are perfectly synchronized in time.

Specifically, FIG. 3 illustrates a decline in throughput with increasing frequency offset without estimating and compensating for the frequency offset between DM-RS ports and CRS ports. As shown in FIG. 3, the demodulation performance of the PDSCH is severely degraded by the frequency offset, if the UE does not do anything to compensate for the phase ramp.

SUMMARY

An object of the present disclosure is to disclose an adaptive scheme for estimating a frequency offset to improve the demodulation performance at a UE.

To achieve the object, according to a first aspect of the present disclosure, there is provided a method used in a UE, for estimating a frequency offset between a CRS of a serving cell of the UE and a DM-RS of a data transmission to be decoded by the UE, using a set of quasi-co-located reference signals. The method includes: comparing a number of Resource Blocks (RBs), for the data transmission to a first threshold; selecting one or more quasi-co-located reference signals from the set of quasi-co-located reference signals based on a result of the comparison; and estimating the frequency offset based on the selected one or more quasi-co-located reference signals.

In an embodiment, the method further includes: comparing a number of DM-RS ports for the data transmission to a second threshold. The selected one or more quasi-co-located reference signals is selected further based on a result of the comparison of the number of DM-RS ports to the second threshold.

In an embodiment, the set of quasi-co-located reference signals includes: the DM-RS; CSI-RS, which is quasi-co-located with the DM-RS with respect to the frequency offset; and CRS, which is quasi-co-located with the DM-RS with respect to the frequency offset.

In an embodiment, the DM-RS is selected from the set of quasi-co-located reference signals when the number of RBs is larger than the first threshold.

In an embodiment, the CSI-RS is selected in addition to the DM-RS from the set of quasi-co-located reference signals when the number of RBs is larger than the first threshold.

In an embodiment, the CRS, which is quasi-co-located with the DM-RS with respect to the frequency offset, is selected from the set of quasi-co-located reference signals only when the number of RBs is smaller than or equal to the first threshold.

In an embodiment, the CSI-RS is selected from the set of quasi-co-located reference signals when the number of RBs is smaller than or equal to the first threshold.

In an embodiment, the DM-RS is used for resolving aliasing of the CSI-RS for frequency offsets larger than 100 Hz.

In an embodiment, the first threshold is a function of the number of DM-RS ports of the data transmission and/or of a Signal to Noise Ratio (SNR)/Signal to Noise and Interference Ratio (SINR), level of the data transmission.

In an embodiment, when the number of RBs is larger than the first threshold and the number of DM-RS ports is smaller than the second threshold, the DM-RS is selected from the set of quasi-co-located reference signals, while the CRS, which is quasi-co-located with the DM-RS with respect to the frequency offset, is not selected.

In an embodiment, the CSI-RS is further selected from the set of quasi-co-located reference signals.

In an embodiment, when the number of RBs is larger than the first threshold and the number of DM-RS ports is larger than or equal to the second threshold, the CRS, which is quasi-co-located with the DM-RS with respect to the frequency offset, and/or the CSI-RS, is selected from the set of quasi-co-located reference signals.

In an embodiment, when the number of RBs is smaller than or equal to the first threshold, the CRS, which is quasi-co-located with the DM-RS with respect to the frequency offset, and/or the CSI-RS is selected from the set of quasi-co-located reference signals.

In an embodiment, the second threshold is a function of the number of RBs of the data transmission and/or of a SNR/SINR level of the data transmission.

According to a second aspect of the present disclosure, there is provided a UE for estimating a frequency offset between a CRS of a serving cell of the UE and a DM-RS of a data transmission to be decoded by the UE, using a set of quasi-co-located reference signals. The UE includes: a comparing unit configured to compare a number of RBs for the data transmission to a first threshold; a selecting unit configured to select one or more quasi-co-located reference signals from the set of quasi-co-located reference signals based on a result of the comparison; and an estimating unit configured to estimate the frequency offset based on the selected quasi-co-located reference signals.

According to a third aspect of the present disclosure, there is provided a UE for estimating a frequency offset between a CRS of a serving cell of the UE and a DM-RS of a data transmission to be decoded by the UE. The UE includes: a processor; and a memory including instructions which, when executed by said processor, cause said UE to: compare a number of Resource Blocks, RBs, for the data transmission to a first threshold; select one or more quasi-co-located reference signals from the set of quasi-co-located reference signals based on a result of the comparison; and estimate the frequency offset based on the selected one or more quasi-co-located reference signals.

According to a fourth aspect of the present disclosure, there is provided a computer program product storing instructions that when executed, cause one or more computing devices to perform the method according to the first aspect of the present disclosure.

The techniques described above provide several advantages, in various embodiments. For example, the techniques may be used to minimize the use of CRS for frequency offset estimation, thereby extending the possibilities for deployments that transmit CRS and DM-RS/PDSCH from different points/nodes. Shared cell deployments where multiple points share the same cell identifier and thus the same CRS would clearly benefit if the UE is using the CRS as little as possible for PDSCH demodulation purposes (which includes channel estimation and frequency offset estimation). In particular, this would enable relaxed requirements on relative clock accuracy between points. Another advantage is that these techniques more fully exploit the benefits offered by the DM-RS estimator and the CSI-RS estimator.

BRIEF DESCRIPTION OF THE DRAWINGS

The above and other object, features, and advantages of the present disclosure will become apparent from the following descriptions on embodiments of the present disclosure with reference to the drawings, in which.

DETAILED DESCRIPTION OF THE EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

To estimate the frequency offset, a UE in Behavior B can use any combination of CRS, DM-RS and CSI-RS ports as long as the CRS and CSI-RS ports that are used can be assumed to be quasi-colocated with the DM-RS, with respect to the frequency offset. This information is known to the UE a priori, e.g., by means of configuration. Taking into account advantages and disadvantages of estimating frequency offset based on each of the various RS ports, a frequency offset estimator that adaptively switches between using different sets of RS ports can be based on the following:

If the number of RBs (or the number of RB pairs) for the PDSCH of interest exceeds a RB-threshold (in some embodiments, it may be a PRB-threshold) and the number of DM-RS ports for the PDSCH (also referred to as transmission rank of the PDSCH) is below a rank-threshold, frequency offset for the PDSCH of interest is estimated based on DM-RS. This doesn't exclude also using CSI-RS, but CRS is not used. A similar threshold technique is used for frequency offset estimation for ePDCCH, except that the rank-threshold is not needed, since the ePDCCH uses a fixed transmission rank of 1.

If the number of RBs(or the number of RB pairs) for the PDSCH of interest is equal to or less than the RB-threshold or the transmission rank of the PDSCH of interest is equal to or higher than the rank-threshold, frequency offset is estimated based on
  Alternative 1: CRS (this doesn't exclude using also DM-RS/CSI-RS).
  Alternative 2: CSI-RS with a possibility to resolve aliasing (which occurs for frequency offsets larger than 100 Hz for a 5 ms periodicity on CSI-RS) by means of DM-RS
  The same goes for the ePDCCH of interest except that the condition related to the rank-threshold is not needed.

The rank-threshold may include being a function of the number of PDSCH RB pairs as well as SNR/SINR level but is in its simplest form a fixed integer
  Suitable values include 5 or 8
The RB-threshold may include being a function of the transmission rank as well as SNR/SINR level but is in its simplest form a fixed integer
  One suitable value is 2.

Note that the number of DM-RS ports for PDSCH or ePDCCH in each subframe is known to the UE prior to any channel estimation and demodulation for that data or control channel. Note also that the criteria for switching between the different types of reference signals for estimating the frequency offset may also depend on additional conditions, including what modulation and coding scheme (MCS) is used for the PDSCH/ePDCCH of interest.

Figure 4:
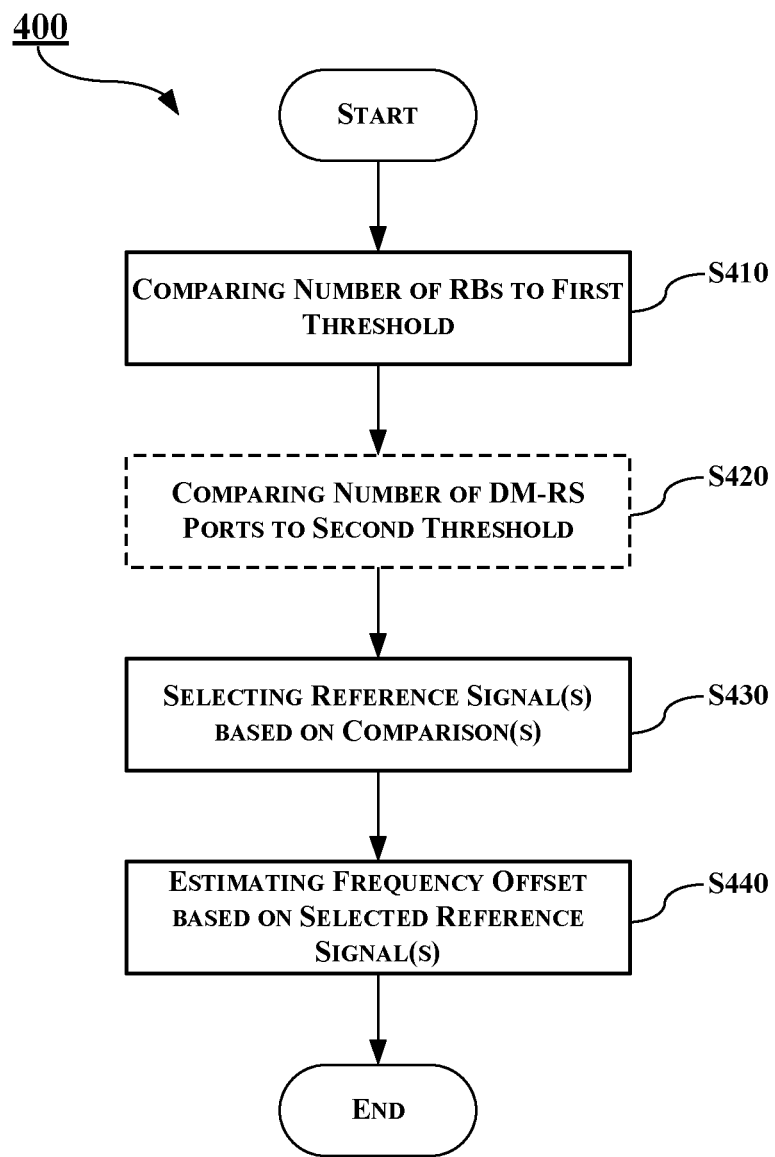
FIG. 4 shows a flowchart of a method 400 according to some embodiments of the present disclosure.

FIG. 4 shows a flowchart of a method 400 according to some embodiments of the present disclosure. The method 400 is used in a UE for estimating a frequency offset between a CRS of a serving cell of the UE and a DM-RS of a data transmission to be decoded by the UE, using a set of quasi-co-located reference signals. For example, the data transmission may be PDSCH or ePDCCH.

In one implementation, the set of quasi-co-located reference signals includes: the DM-RS; CSI-RS, which is quasi-co-located with the DM-RS with respect to the frequency offset; and CRS, which is quasi-co-located with the DM-RS with respect to the frequency offset.

At step S410, a number of RBs for the data transmission is compared to a first threshold. For example, the first threshold may be a fixed integer, such as 2, but might alternatively be a function of the number of DM-RS ports of the data transmission and/or of a SNR/SINR level of the data transmission.

At step S430, one or more quasi-co-located reference signals is selected from the set of quasi-co-located reference signals based on a result of the comparison of step S410.

At step S440, the frequency offset is estimated based on the selected one or more quasi-co-located reference signals.

Before step S430, the method 400 optionally include step 420 of comparing a number of DM-RS ports for the data transmission to a second threshold. In this case, the selected one or more quasi-co-located reference signals is selected further based on a result of step S420. For example, the second threshold may be a fixed integer, e.g., from 1 to 8, with specific examples being 5 or 8. In other embodiments, the second threshold may be a function of the number of RBs of the data transmission and/or of a SNR/SINR level of the data transmission.

Figure 5:
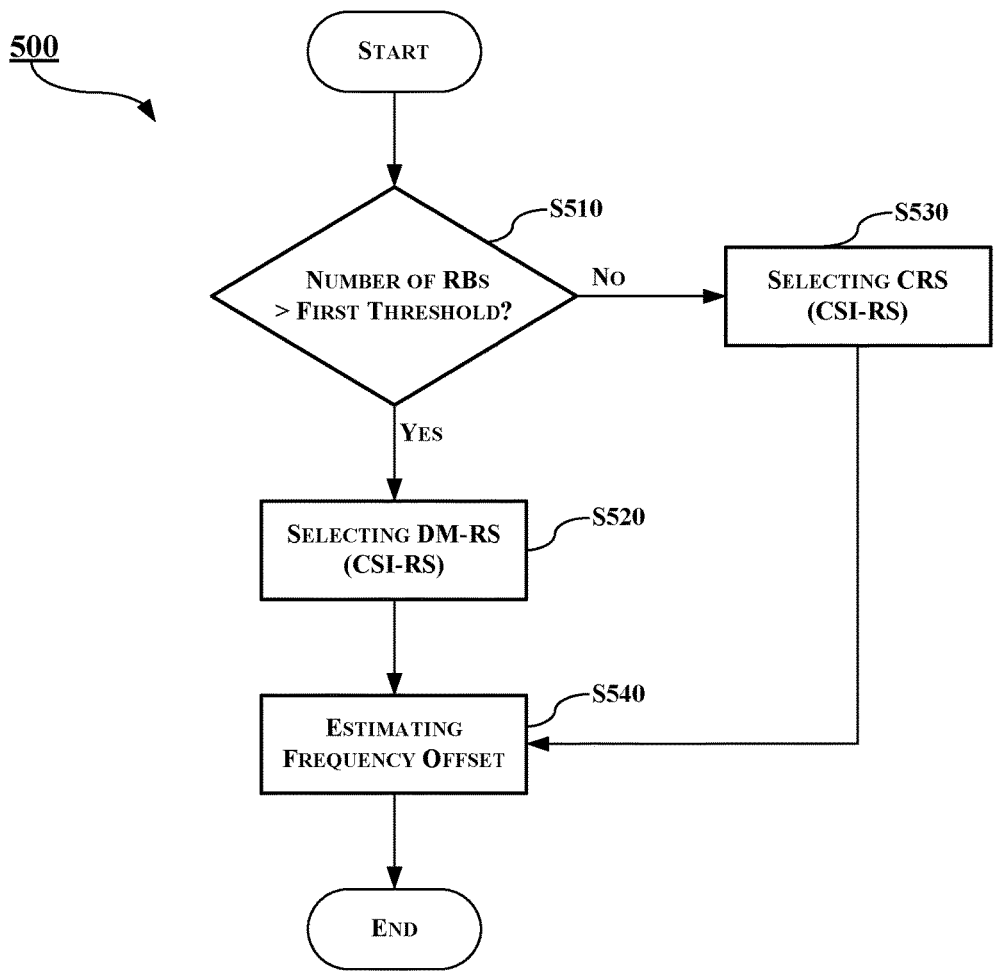
FIG. 5 illustrates a flowchart of an example method 500 of the method 400 according to some embodiments of the present disclosure.

FIG. 5 illustrates a flowchart of an example method 500 of the method 400 according to some embodiments of the present disclosure. The method 500 includes steps S510, S620, S530 and S540. Steps S510 and S540 substantially correspond to steps S410 and S440, respectively, thus descriptions thereof will be omitted. Moreover, steps S520 and S530 correspond to step S430.

At step S520, when the number of RBs is larger than the first threshold, the DM-RS is selected from the set of quasi-co-located reference signals. Alternatively, the CSI-RS may be selected in addition to the DM-RS from the set of quasi-co-located reference signals when the number of RBs is larger than the first threshold.

At step S530, the CRS, which is quasi-co-located with the DM-RS with respect to the frequency offset, is selected from the set of quasi-co-located reference signals when the number of RBs is smaller than or equal to the first threshold. In one embodiment, the CRS, which is quasi-co-located with the DM-RS with respect to the frequency offset, may be selected only when the number of RBs is smaller than or equal to the first threshold.

As a feasible implementation for step S530, when the number of RBs is smaller than or equal to the first threshold, the CSI-RS may be selected from the set of quasi-co-located reference signals. Alternatively or additionally, the DM-RS may be used for resolving aliasing of the CSI-RS for frequency offsets larger than 100 Hz.

Figure 6:
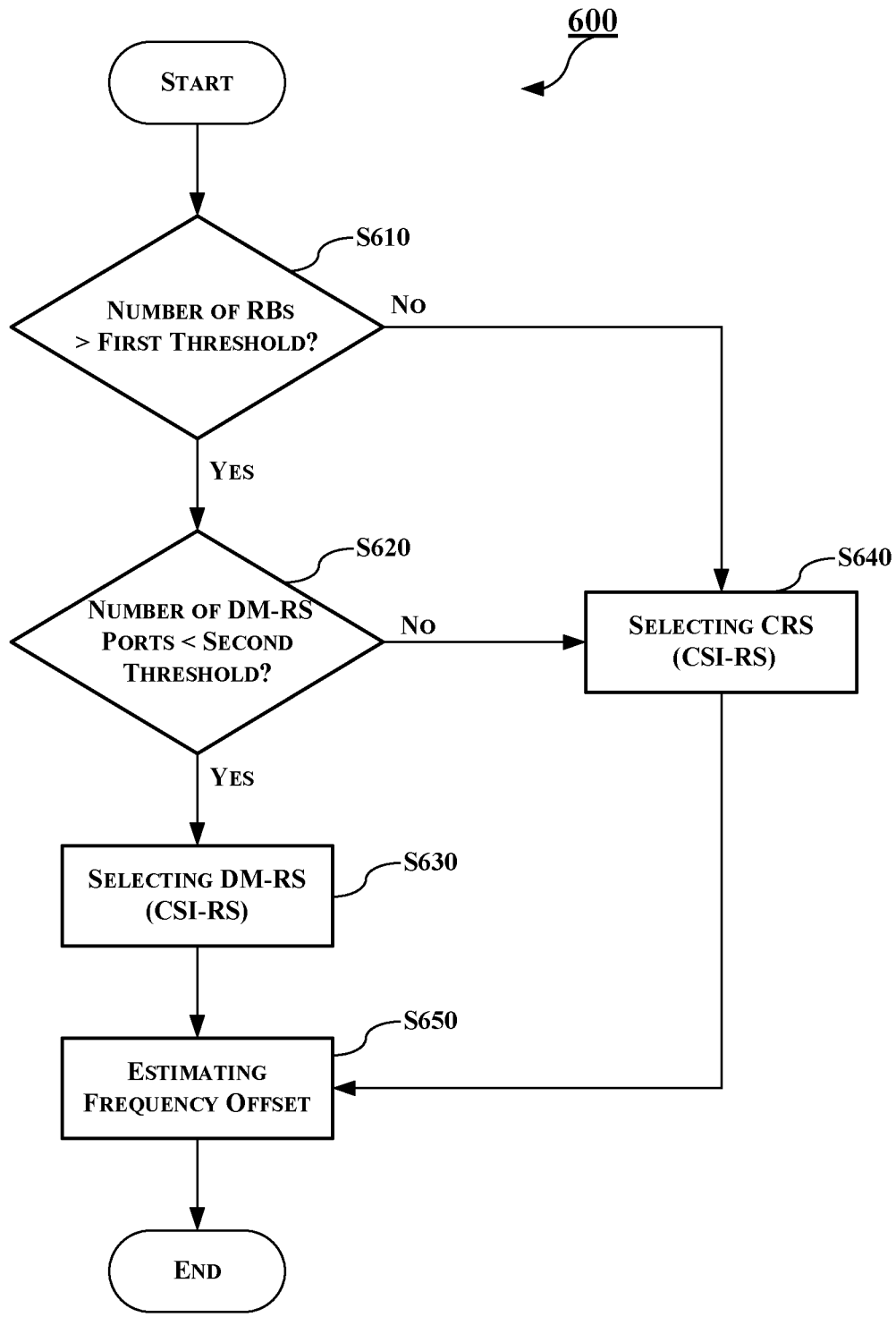
FIG. 6 illustrates a flowchart of another example method 600 of the method 400 according to some embodiments of the present disclosure.

FIG. 6 illustrates a flowchart of another example method 600 of the method 400 according to some embodiments of the present disclosure. The method 600 includes steps S610, S620, S630, S640 and S650. Steps S610, S620 and S650 substantially correspond to steps S410, S420 and S440, respectively, thus descriptions thereof will be omitted. Moreover, steps S630 and S640 correspond to step S430.

At step S630, when the number of RBs is larger than the first threshold and the number of DM-RS ports is smaller than the second threshold, the DM-RS is selected from the set of quasi-co-located reference signals, while the CRS, which is quasi-co-located with the DM-RS with respect to the frequency offset, is not selected. Alternatively or additionally, the CSI-RS may be further selected from the set of quasi-co-located reference signals.

At step S640, when the number of RBs is larger than the first threshold and the number of DM-RS ports is larger than or equal to the second threshold (i.e., the 'No' branch of step S620), the CRS, which is quasi-co-located with the DM-RS with respect to the frequency offset, and/or the CSI-RS may be selected from the set of quasi-co-located reference signals.

As a feasible implementation for step S640, when the number of RBs is smaller than or equal to the first threshold (i.e., the 'No' branch of step S610), the CRS, which is quasi-co-located with the DM-RS with respect to the frequency offset, and/or the CSI-RS, may be selected from the set of quasi-co-located reference signals.

One major advantage with the frequency offset estimation scheme is to minimize the use of CRS for frequency offset estimation, thereby extending the possibilities for deployments that transmit CRS and DM-RS/PDSCH from different points/nodes. Another advantage is that the present disclosure may more fully exploit the benefits offered by DM-RS based estimation and CSI-RS based estimation.

The following descriptions will be made on demonstrating how estimators based on CSI-RS, CRS and DM-RS, respectively, may work, with reference to FIGS. 7-10.

CSI-RS Based Frequency Offset Estimation

Figure 7:
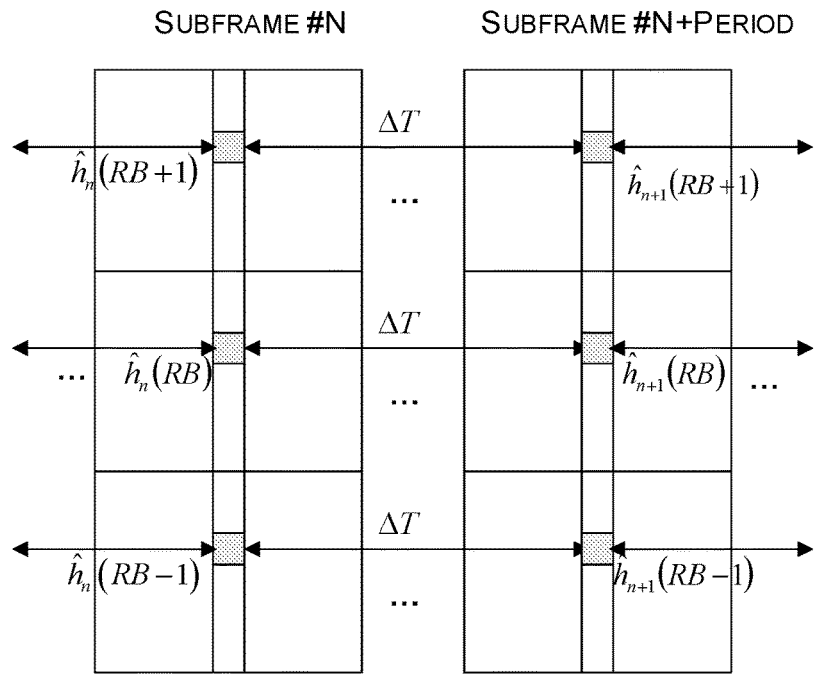
FIG. 7 depicts a pilot pattern of a non-zero power CSI-RS resource that is quasi-colocated with a DM-RS of interest.

FIG. 7 depicts a pilot pattern of a non-zero power CSI-RS resource that is quasi-colocated with a DM-RS of interest.

In FIG. 7, $\hat{h}_n$ (RB) denotes a channel estimation based on CSI-RS (after de-spreading, if two ports are code multiplexed on the same resource elements) in the resource block indexed by RB at subframe #N. Since the UE may buffer channel estimates for multiple CSI-RS subframes, the subframe #N is associated with a number n to denote its index in the buffer. $\Delta T$ denotes a time interval between two adjacent CSI-RS subframes stored in the buffer and is in a unit of second.

Let $\Delta \hat{f}$ (in a unit of Hz) denote the frequency offset estimate. It can be obtained via the following equation:

$$\Delta \hat{f} = \frac{\text{angle}\left[\sum_{n \in buffer} \sum_{RB \in sysBW} \hat{h}_n^*(RB) \cdot \hat{h}_{n+1}(RB)\right]}{2\pi \cdot \Delta T} \quad (1)$$

where the operator * denotes the complex conjugate, the inner summation $$\sum_{RB \in sysBW}$$

is over the bandwidth of interest (for CSI-RS, it could be the entire system bandwidth except for possibly a few RBs in the center), the second summation $$\sum_{n \in buffer}$$

is over all the CSI-RS subframes buffered by the UE, and angle [·] denotes the angle of a complex number ($-\pi <$ angle $[\cdot] \leq \pi$).

It is worth noting that the frequency offset $\Delta \hat{f}$ estimated from Equation (1) is only for a single CSI-RS port. In the case of multiple CSI-RS ports configured (within the same non-zero CSI-RS resource), one can combine the estimation from each port in any of several manners, such as according to a selection criterion or by averaging the estimations from the ports.

Figure 1:
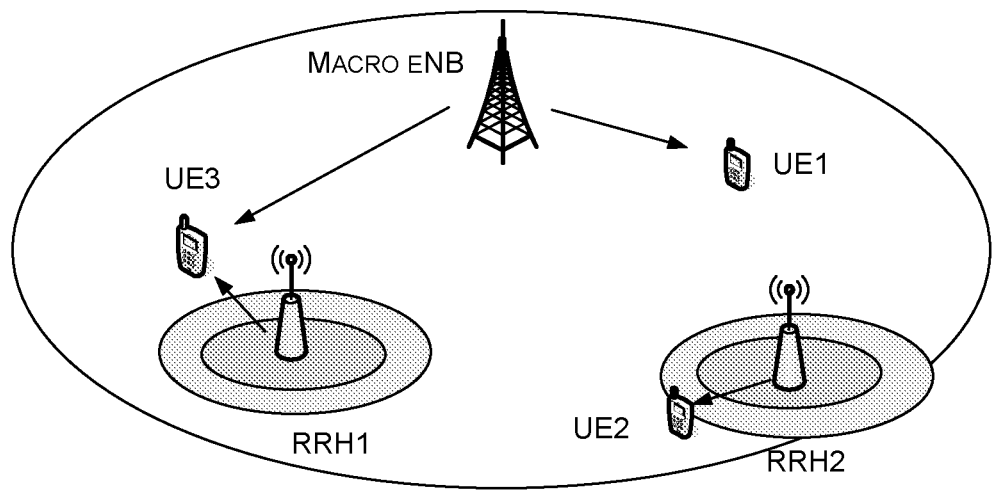
FIG. 1 illustrates a CoMP scenario according to the prior art.
Figure 2:
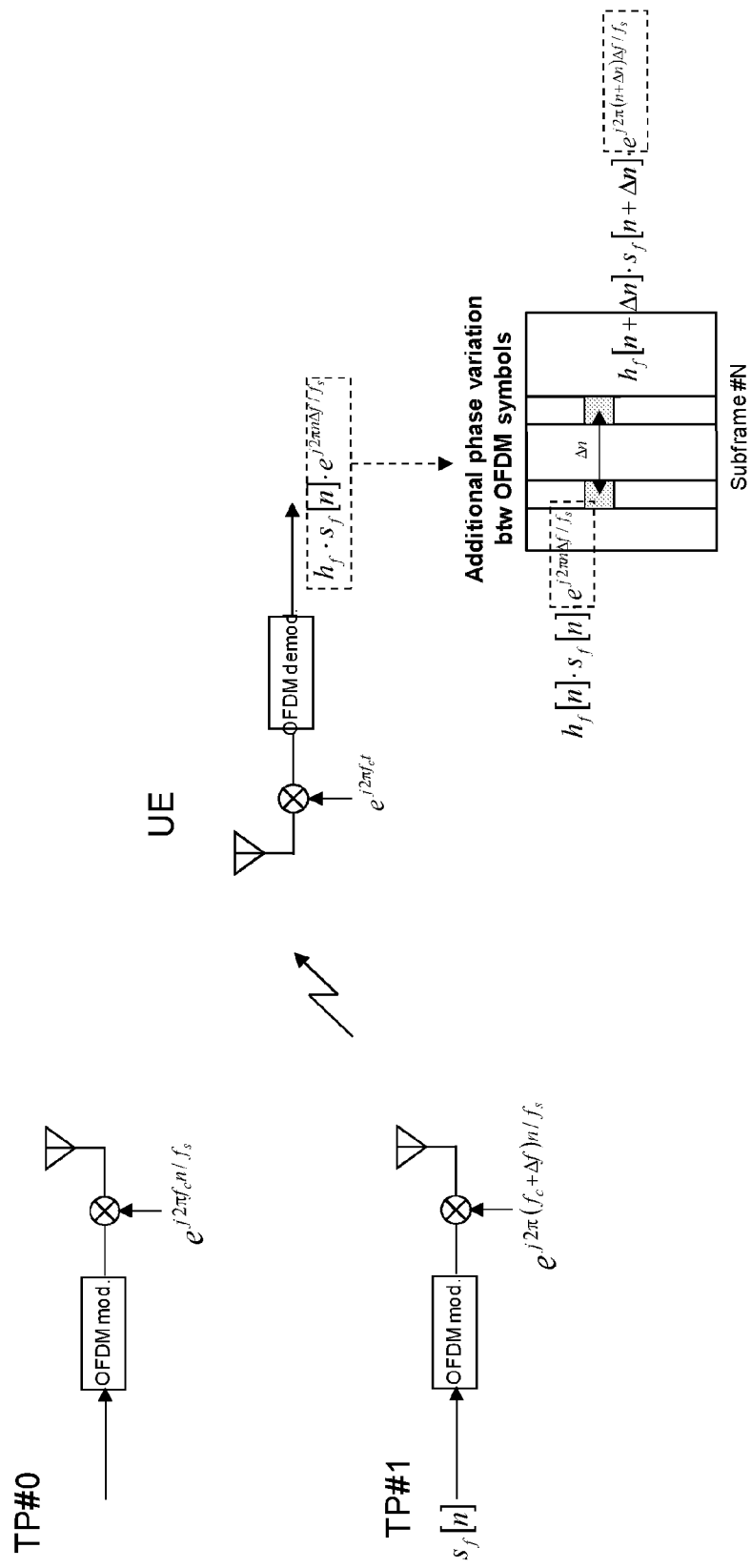
FIG. 2 illustrates frequency offset generation due to clock rate differences, and its impact on a subcarrier on the UE side.
Figure 3:
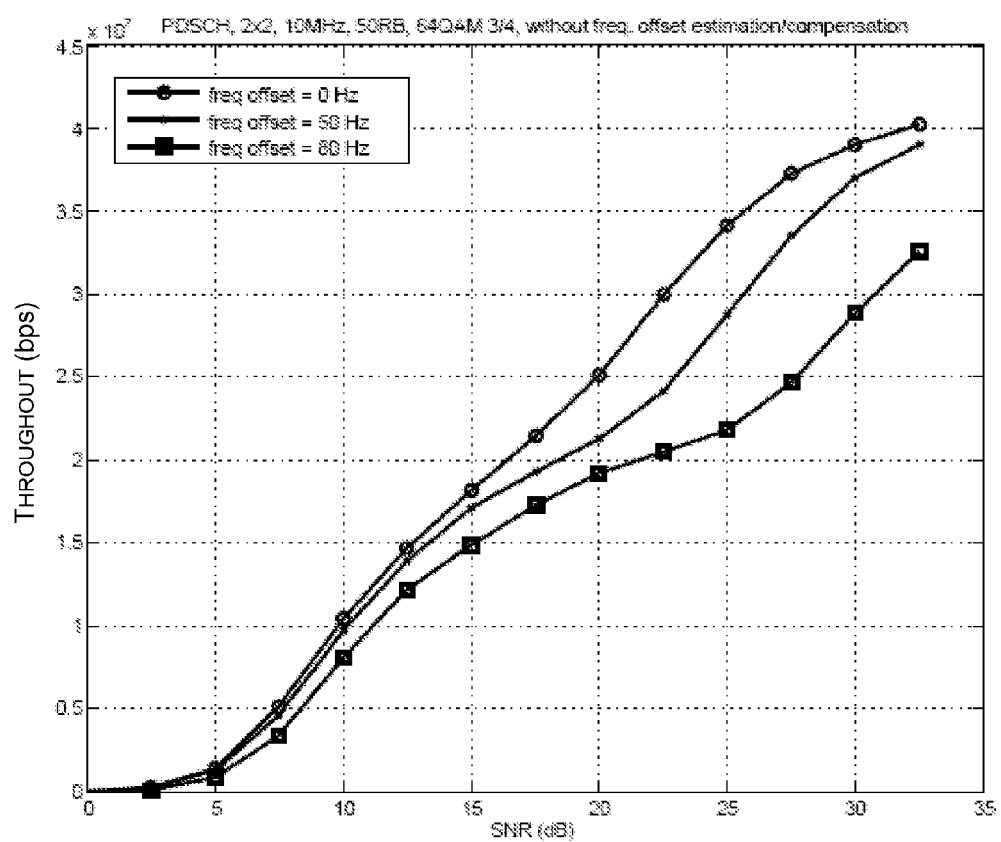
FIG. 3 shows simulation results from a CoMP system.

Once the frequency offset has been determined, channel estimation can be carried out, e.g., using DM-RS that have been compensated, using the estimated frequency offset. As can be seen in FIG. 2, the impact of a frequency offset $\Delta f$ on the received signal on a subcarrier in OFDM symbol n is a phase rotation of $2\pi \cdot n \cdot \Delta f/f_s$. Thus, after obtaining the frequency offset estimate $\Delta \hat{f}$, the received signal can be compensated by de-rotating it with a phase rotation of $-2\pi \cdot n \cdot \Delta \hat{f}/f_s$, for each OFDM symbol (n is the time index of an OFDM symbol).

Figure 8:
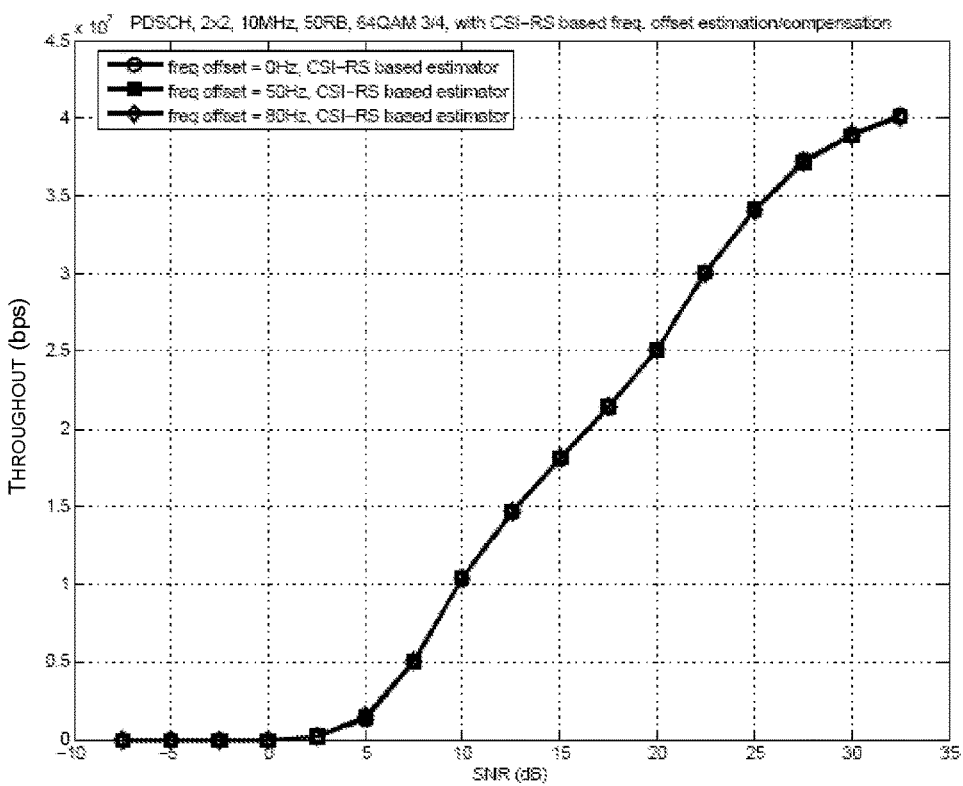
FIG. 8 illustrates simulation results for performances after estimating (CSI-RS based) and compensating for the frequency offset between DM-RS ports and CRS ports.

FIG. 8 illustrates simulation results for performances after estimating (CSI-RS based) and compensating for the frequency offset between DM-RS ports and CRS ports, so as to demonstrate the effectiveness of the CSI-RS based estimator. With a frequency offset up to 80 Hz, no obvious performance loss is seen by the use of our CSI-RS based frequency offset estimator to obtain compensated channel estimates for use in demodulating the received signal.

Using CSI-RS to estimate the frequency offset is effective, as demonstrated above. However, since the CSI-RS is quite sparse in time (at most in one out of five subframes), the estimator will suffer from aliasing caused by large frequency offsets, thus causing ambiguities emanating from the periodicity of the CSI-RS in relation to the size of the frequency offset. In principle, the maximum frequency offset that can be estimated from CSI-RS is $\pm 100$ Hz (200 Hz=⅕ ms). In practice, this range will be further reduced by the pollution of noise, interference, and imperfections such as radio frequency impairments. However, the aliasing problem can be resolved by using a combination of CSI-RS and other RS ports, such as DM-RS ports, to eliminate ambiguities.

CRS Based Frequency Offset Estimation

CRS-based frequency offset estimation works in a similar manner as the CSI-RS based estimation. The principles captured by Equation (1) still hold (except that $\hat{h}_n$(RB) denotes the channel estimate based on CRS, rather than CSI-RS), but the RS patterns for CRS and CSI-RS differ.

To be specific, CRS is transmitted with a 1 millisecond periodicity (i.e., every subframe). Eight resource elements (REs) per Physical Resource Block (PRB) pair are used for ports 0 and 1, respectively, while port 2 and 3 are using 4 REs each per PRB pair. In contrast, CSI-RS comes at most every 5 milliseconds and typically uses an average of 1 RE per port per PRB pair. Thus, the parameter $\Delta T$ in Equation (1) will be smaller, when Equation (1) is applied to channel estimates obtained from CRS, and will typically correspond to the time between two OFDM symbols carrying the RS for the same CRS port. Just as for CSI-RS, the estimate may be improved by averaging data over multiple CRS ports.

An advantage of using CRS for frequency estimation is that it works for high frequency offsets. Because the pattern is dense, the accuracy is high.

DM-RS Based Frequency Offset Estimation

For the CRS-based frequency estimation method discussed above, the CRS may be transmitted from a point other than the point(s) used for DM-RS-based PDSCH. Thus, the frequency offset estimated based on CRS would not reflect the frequency offset of the correct point(s), in this scenario. Furthermore, the CSI-RS based estimator suffers from the sparseness, in the time domain, of the pilot pattern formed by the CSI-RS. Thus, neither the CRS nor the CSI-RS covers all situations.

Figure 9:
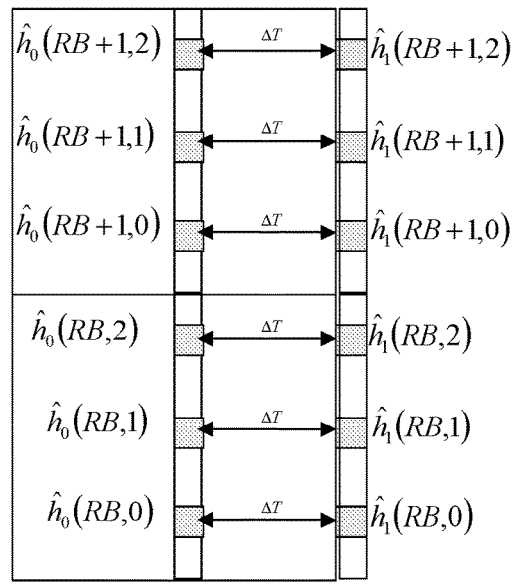
FIG. 9 shows a pilot pattern of a DM-RS port assuming at most two DM-RS ports are multiplexed on the same RE.

FIG. 9, shows a pilot pattern of a DM-RS port (after de-spreading, i.e., the removal of any code-division multiplexing) assuming at most two DM-RS ports are multiplexed on the same RE.

In FIG. 9, $\hat{h}_0$(RB,k) denotes the channel estimate (after a length-2 de-spreading) on the k-th DM-RS pilot position in slot #0 of the RB indexed by RB. $\hat{h}_1$(RB,k) denotes the estimate in slot #1.

It is worth noting that if 5 to 8 DM-RS ports are used (i.e., a transmission rank of 5 to 8) in a PDSCH, the pilot pattern for some ports will be different from the one here. This is because in subframes containing 5 to 8 DM-RS ports, at least one DM-RS port will be code-division multiplexed with two or three other ports. For those ports, only one channel estimate is available on each subcarrier in an RB after the length-4 de-spreading. In other words, $\hat{h}_1(RB,k)$ does not exist. On the other hand, even if the DM-RS are code-division multiplexed using an orthogonal cover code (OCC) length of 4 for rank 5 to 8, it is still possible to de-spread the DM-RS using OCC length 2, for the purpose of frequency estimation, to get at least one DM-RS port not interfered with by any other port, as long as the rank is 7 or less. Hence, for 1 to 7 DM-RS ports, it is possible to always get separate channel estimates for the two slots within a subframe and hence DM-RS-based frequency offset estimation within a subframe is feasible.

Given a DM-RS port that is multiplexed with at most one other port, the frequency offset may be estimated using the following equation:

$$\Delta \hat{f} = \frac{\text{angle}\left[\sum_{RB} \sum_{k=0}^{2} \hat{h}_0^*(RB, k) \cdot \hat{h}_1(RB, k)\right]}{2\pi \cdot \Delta T} \quad (2)$$

where $\Delta T$=0.5 milliseconds, and the summation $$\sum_{RB}$$

is over the RBs that are scheduled for the PDSCH or ePDCCH.

Note that the frequency offset $\Delta \hat{f}$ estimated from Equation (2) is only for a single DM-RS port. In the case of multiple DM-RS ports configured, one can combine the estimation from each port in any of several ways, such as by applying a selection criterion or averaging the multiple estimations.

Figure 10:
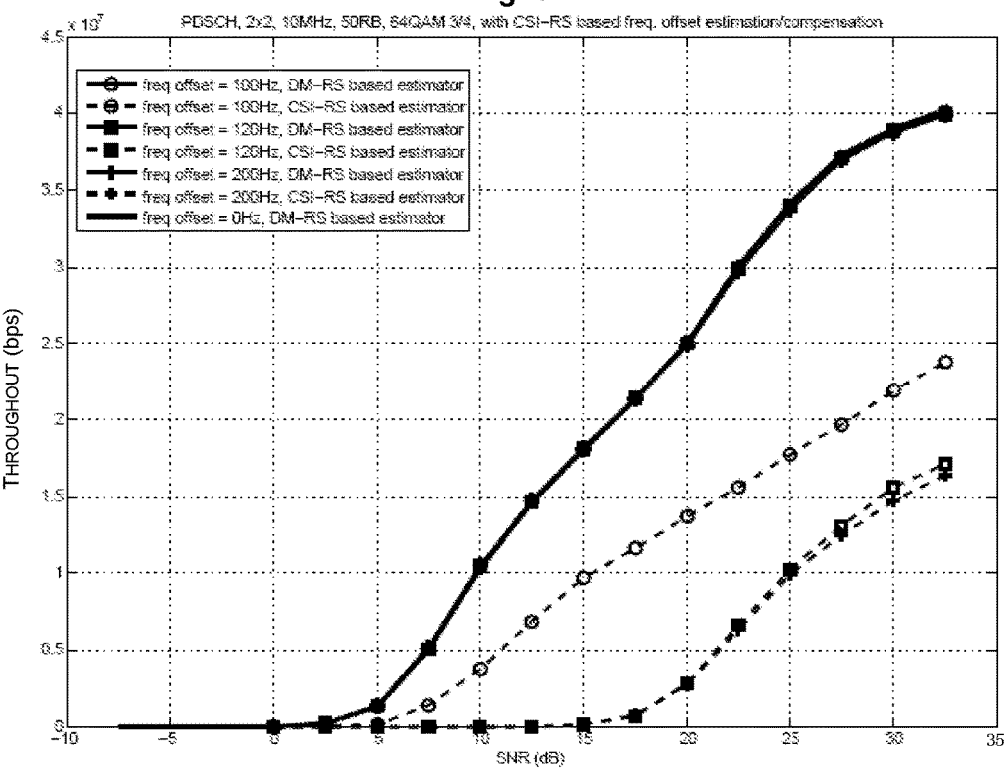
FIG. 10 illustrates simulation results for performances after estimating and compensating for the frequency offset between DM-RS ports and CRS ports.

FIG. 10 illustrates simulation results for performances after estimating and compensating for the frequency offset between DM-RS ports and CRS ports, so as to verify the performance of the DM-RS based estimator.

As shown in FIG. 10, the DM-RS based estimator can handle a frequency offset up to 200 Hz without noticeable degradation, while on the other hand, the CSI-RS estimator suffers from severe aliasing once the offset is above 100 Hz.

Given the fact that the time span between two DM-RS pilots in different slots is 0.5 milliseconds, the largest frequency offset that the DM-RS-based estimator can handle is ±1000 Hz (=1/0.5 ms), in principle. This is ten times the offset that a CSI-RS-based estimator can handle. Moreover, the DM-RS-based estimator can leverage the pre-coding gain in cases where, for example, 8 CSI-RS ports and only 1 DM-RS ports are configured, to achieve better performance.

Although the DM-RS based estimator seems better than the CSI-RS based estimation in most cases, there is at least one situation where the frequency offset cannot be estimated based on DM-RS. That is the case where 8 DM-RS ports are used for PDSCH in a subframe, since the length-4 OCC spans both slots and it is thus difficult and/or complex to obtain two channel estimates from two slots. Furthermore, estimation using multiple subframes, like was done in the CSI-RS based estimation, should not be used. Note that in the context of CoMP, the DM-RS in different subframes might come from different transmission points; thus, one should refrain from using DM-RS in adjacent subframes for this purpose.

Estimating the frequency offset for small PDSCH allocations is difficult because of the very few DM-RS channel estimates available. Moreover, the estimation accuracy will be very poor, especially for low SNRs. Compensation with unreliable estimates can be very harmful for the performance.

Taking into account both advantages and disadvantages of the various estimator types, an adaptive scheme for the frequency offset estimation is presented below. This scheme facilitates an intelligent switching between DM-RS, CSI-RS, and CRS -based estimators.

Figure 11:
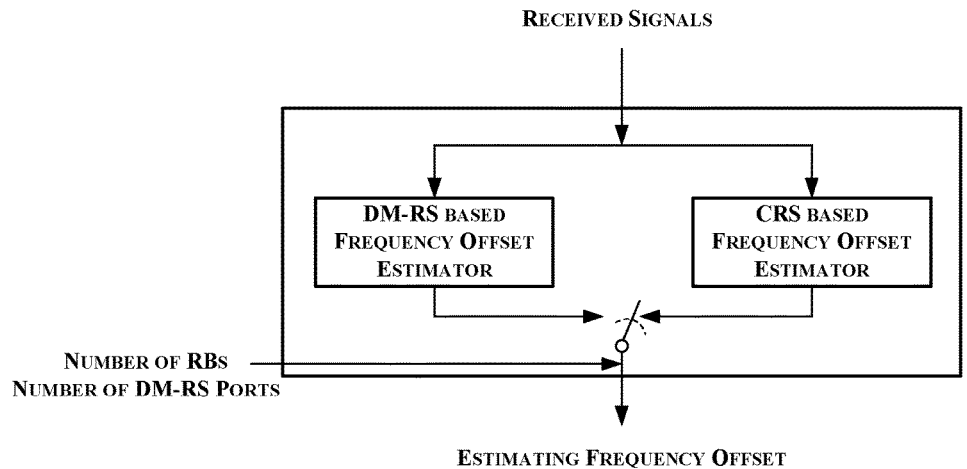
FIG. 11 illustrates an exemplary schematic diagram of an adaptively switching frequency offset estimator that switches between using DM-RS and CRS.
Figure 12:
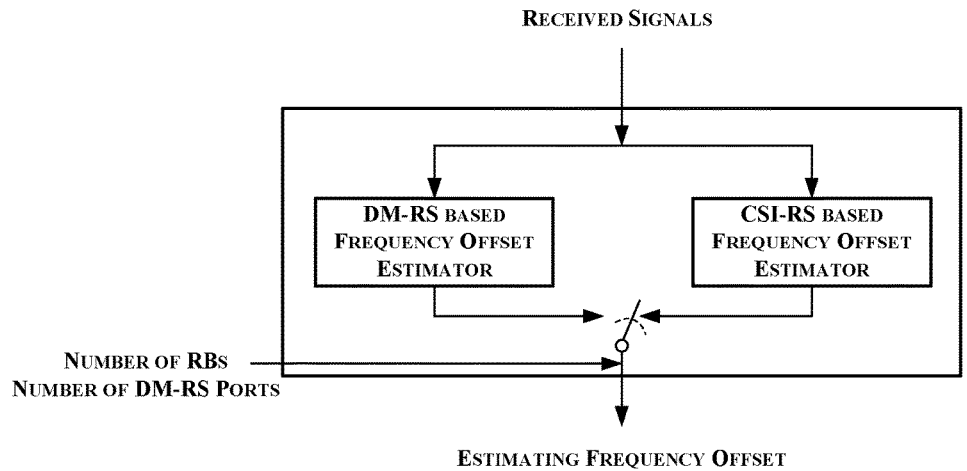
FIG. 12 illustrates an exemplary schematic diagram of an adaptively switching frequency offset estimator that switches between using DM-RS and CSI-RS.

FIG. 11 illustrates an exemplary schematic diagram of an adaptively switching frequency offset estimator that switches between using DM-RS and CRS, and FIG. 12 illustrates an exemplary schematic diagram of an adaptively switching frequency offset estimator that switches between using DM-RS and CSI-RS.

If the number of RBs on PDSCH or ePDCCH is larger than a RB-threshold (i.e., sufficient bandwidth has been allocated to PDSCH or ePDCCH) and the number of DM-RS ports (or the transmission rank) is smaller than a rank-threshold, the DM-RS based frequency offset estimation may be used. For rank 1 to 4, the UE de-spreads the code-multiplexed DM-RS using an OCC length of 2 to support estimation within a single subframe of data. For rank 5 to 7, the UE can still de-spread using an OCC of length 2 at least for one of the ports to get the two channel estimates corresponding to the first and second slots within a subframe. This would allow the rank-threshold to be set to the value of 8. A rank-threshold value of 5 would be used if the OCC length-2 de-spreading approach for rank 5 to 7 is not deemed sufficiently accurate. In general, any rank-threshold value between 2 and 8 is conceivable. Similarly, any value of the RB-threshold is conceivable, but current investigations indicate that using a RB-threshold of 2 would guarantee good demodulation performance.

If the frequency offset estimated from DM-RS is less than 100 Hz, then the UE may consider combining with a frequency estimate from CSI-RS.

If the number of DM-RS ports is larger than or equal to the rank-threshold or the number of RBs on PDSCH or ePDCCH smaller or equal to the RB-threshold, then some other reference signals must be involved in the frequency offset estimation. For example, the UE may switch to using CRS for the frequency offset estimation. This is illustrated in FIG. 11.

Another alternative is to use CSI-RS ports to do the frequency offset estimation, which is illustrated in FIG. 12. When using CSI-RS for the frequency offset estimation, a potential problem is that frequency offsets greater than 100 Hz cannot be handled using CSI-RS. A possibility is then to use the DM-RS frequency estimate to resolve ambiguities in the frequency offset estimation if the frequency offset is greater than 100 Hz.

Note that the number of DM-RS ports for PDSCH or ePDCCH in each subframe is known to the UE prior to any channel estimation and demodulation for that traffic or control channel.

MCS for the PDSCH of interest may be used as an additional input to a switching algorithm for switching between uses of different types of reference symbols. This may improve performance, since the impact on demodulation performance of frequency estimation errors varies with MCS, in particular with respect to the modulation. So, for a higher order modulation such as 64-QAM it may be necessary to use a higher PRB and/or rank-threshold than for a lower modulation format like QPSK.

Figure 13:
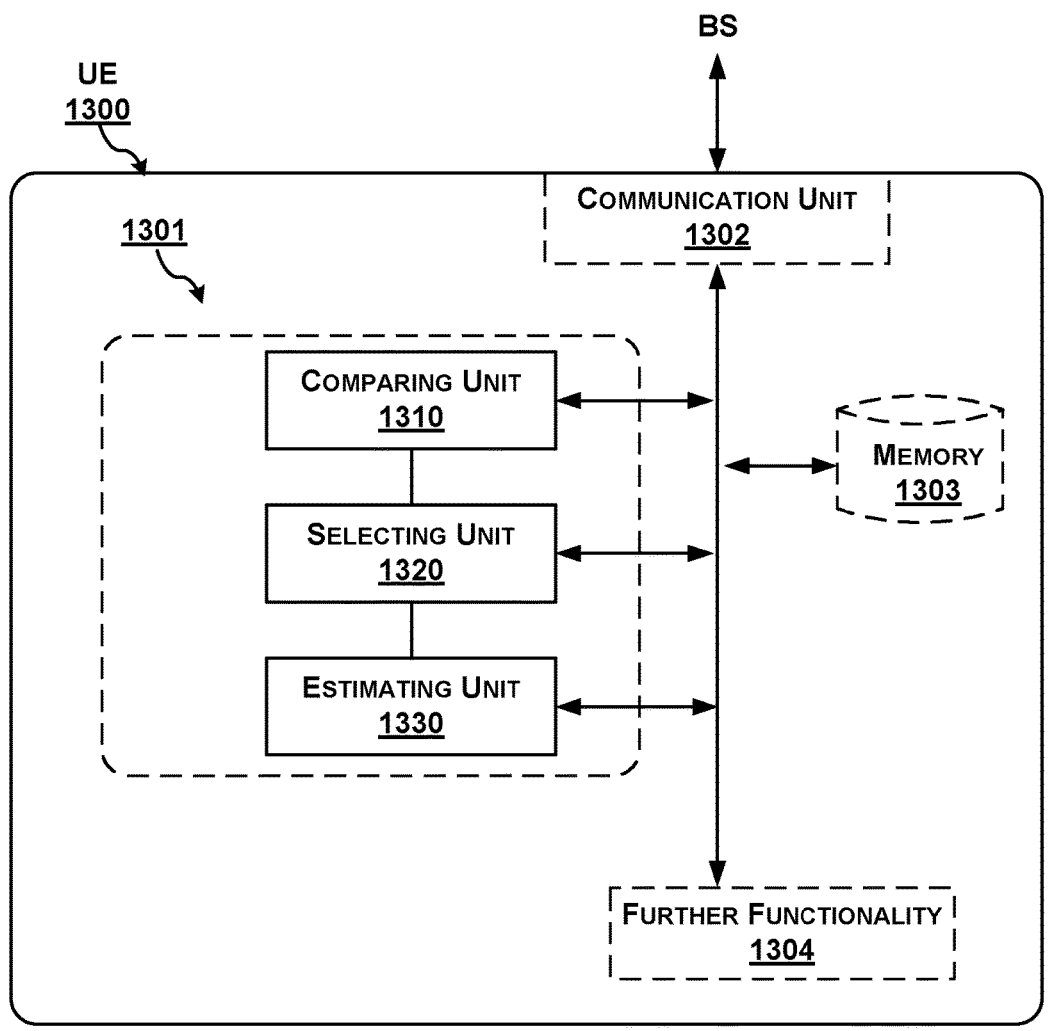
FIG. 13 is a schematic block diagram of a UE 1300 according to some embodiments of the present disclosure.

FIG. 13 is a schematic block diagram of a UE 1300 according to some embodiments of the present disclosure. The UE 1300 may be used for estimating a frequency offset between a CRS of a serving cell of the UE and a DM-RS of a data transmission to be decoded by the UE, using a set of quasi-co-located reference signals. For example, the data transmission may be PDSCH or ePDCCH.

In one implementation, the set of quasi-co-located reference signals includes: the DM-RS; CSI-RS, which is quasi-co-located with the DM-RS with respect to the frequency offset; and CRS, which is quasi-co-located with the DM-RS with respect to the frequency offset.

The part of the UE 1300 which is most affected by the adaptation to the herein described method, e.g., the method 400, 500 or 600, is illustrated as an arrangement 1301, surrounded by a dashed line. The UE 1300 could be e.g. a mobile terminal, depending on in which type of communication system it is operable, e.g., LTE-type systems. For example, the UE 1300 may be configured for operation with, for example, an LTE network, formally known as the Evolved Universal Terrestrial Radio Access Network (E-UTRAN). The UE 1300 and arrangement 1301 are further configured to communicate with other entities via a communication port 1302 which may be regarded as part of the arrangement 1301. The communication port 1302 comprises means for wireless communication, such as an antenna. The arrangement 1301 or UE 1300 may further comprise other functional units 1304, such as functional units providing regular UE functions, and may further comprise one or more storage units or memories 1303 for storing computer program code and other information thereon. The memory 1303 may comprise one or several types of memory such as read-only memory (ROM), random-access memory, cache memory, flash memory devices, optical storage devices, etc.

The arrangement 1301 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 4, 5, or 6. The arrangement part of the UE 1300 may be implemented and/or described as follows.

Referring to FIG. 13, the UE 1300 may include a comparing unit 1310, a selecting unit 1320 and an estimating unit 1330.

The comparing unit 1310 is configured to compare a number of RBs for the data transmission to a first threshold. For example, the first threshold may be a fixed integer, such as 2, but might alternatively be a function of the number of DM-RS ports of the data transmission and/or of a SNR/SINR level of the data transmission.

The selecting unit 1320 is configured to select one or more quasi-co-located reference signals from the set of quasi-co-located reference signals based on a result of the comparison.

The estimating unit 1330 is configured to estimate the frequency offset based on the selected quasi-co-located reference signals.

Alternatively or additionally, the comparing unit 1310 may in some embodiments further be configured to compare a number of DM-RS ports for the data transmission to a second threshold. In this case, the selecting unit 1320 may be configured to select the one or more quasi-co-located reference signals further based on a result of the comparison of the number of DM-RS ports to the second threshold. For example, the second threshold may be a fixed integer, e.g., from 1 to 8, with specific examples being 5 or 8. In other embodiments, the second threshold may be a function of the number of RBs of the data transmission and/or of a SNR/SINR level of the data transmission.

In an implementation, the selecting unit 1320 may select the DM-RS from the set of quasi-co-located reference signals when the number of RBs is larger than the first threshold. Alternatively or additionally, the selecting unit 1320 may select the CSI-RS in addition to the DM-RS from the set of quasi-co-located reference signals when the number of RBs is larger than the first threshold.

In an implementation, the selecting unit 1320 may select the CRS, which is quasi-co-located with the DM-RS with respect to the frequency offset, from the set of quasi-co-located reference signals only when the number of RBs is smaller than or equal to the first threshold.

In an implementation, the selecting unit 1320 may select the CSI-RS from the set of quasi-co-located reference signals when the number of RBs is smaller than or equal to the first threshold. Alternatively or additionally, the DM-RS may be used for resolving aliasing of the CSI-RS for frequency offsets larger than 100 Hz.

In an implementation, the selecting unit 1320 may select the DM-RS from the set of quasi-co-located reference signals, and not to select the CRS, which is quasi-co-located with the DM-RS with respect to the frequency offset, when the number of RBs is larger than the first threshold and the number of DM-RS ports is smaller than the second threshold. Alternatively or additionally, the selecting unit 1320 may be configured to further select the CSI-RS from the set of quasi-co-located reference signals.

In an implementation, the selecting unit 1320 may select the CRS, which is quasi-co-located with the DM-RS with respect to the frequency offset, and/or the CSI-RS from the set of quasi-co-located reference signals when the number of RBs is larger than the first threshold and the number of DM-RS ports is larger than or equal to the second threshold.

In an implementation, the selecting unit 1320 may select the CRS, which is quasi-co-located with the DM-RS with respect to the frequency offset, and/or the CSI-RS from the set of quasi-co-located reference signals when the number of RBs is smaller than or equal to the first threshold.

It should be noted that two or more different units in this disclosure may be logically or physically combined. For example, the comparing unit 1310 and the selecting unit 1320 may be combined as one single unit.

Figure 14:
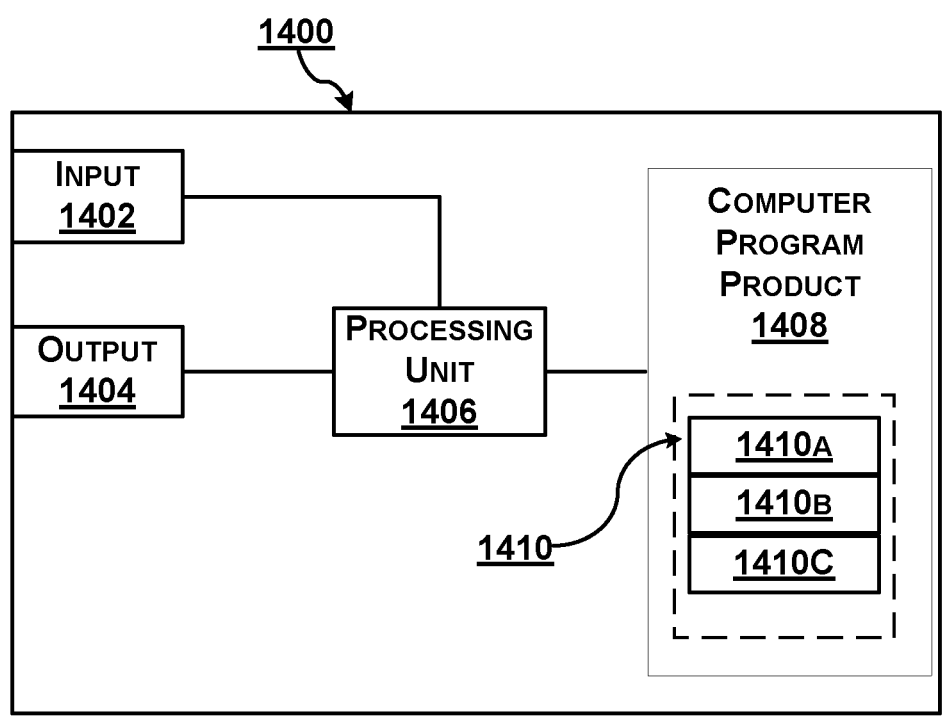
FIG. 14 schematically shows an embodiment of an arrangement 1400 which may be used in the UE 1300.

FIG. 14 schematically shows an embodiment of an arrangement 1400 which may be used in the UE1300. Comprised in the arrangement 1400 are here a processing unit 1406, e.g., with a Digital Signal Processor (DSP). The processing unit 1406 may be a single unit or a plurality of units to perform different actions of procedures described herein. The arrangement 1400 may also comprise an input unit 1402 for receiving signals from other entities, and an output unit 1404 for providing signal(s) to other entities. The input unit and the output unit may be arranged as an integrated entity or as illustrated in the example of FIG. 13.

Furthermore, the arrangement 1400 comprises at least one computer program product (or computer-readable storage medium) 1408 in the form of a non-volatile or volatile memory, e.g., an Electrically Erasable Programmable Read-Only Memory (EEPROM), a flash memory and a hard drive.

The computer program product 1408 comprises a computer program 1410, which comprises code/computer readable instructions, which when executed by the processing unit 1406 in the arrangement 1400 cause the arrangement 1400 and/or the UE in which it is comprised to perform the actions, e.g., of the procedure described earlier in conjunction with FIG. 4, 5 or 6.

The computer program 1410 may be configured as a computer program code structured in computer program modules 1410A, 1410B and 1410C.

Hence, in an exemplifying embodiment when the arrangement 1400 is used in the UE1300, the code in the computer program of the arrangement 1400 includes a comparing module 1410A, for comparing a number of Resource Blocks (RBs), for the data transmission to a first threshold. The code in the computer program 1410 further includes a selecting module 1410B, for selecting one or more quasi-co-located reference signals from the set of quasi-co-located reference signals based on a result of the comparison. The code in the computer program 1410 further includes an estimating module 1410C for estimating the frequency offset based on the selected one or more quasi-co-located reference signals. The comparing module 1410A may further compare a number of DM-RS ports for the data transmission to a second threshold. In this case, the selecting module 1410B may select the one or more quasi-co-located reference signals further based on a result of the comparison of the number of DM-RS ports to the second threshold.

The computer program modules could essentially perform the actions of the flow illustrated in FIG. 4, 5 or 6, to emulate the arrangement 1301 in the UE1300. In other words, when the different computer program modules are executed in the processing unit 1406, they may correspond, e.g., to the units 1310-1330 of FIG. 13.

Although the code means in the embodiments disclosed above in conjunction with FIG. 14 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

It should be appreciated that the techniques described above provide several advantages, in various embodiments. For example, the techniques may be used to minimize the use of CRS for frequency offset estimation, thereby extending the possibilities for deployments that transmit CRS and DM-RS/PDSCH from different points/nodes. Shared cell deployments where multiple points share the same cell identifier and thus the same CRS would clearly benefit if the UE is using the CRS as little as possible for PDSCH demodulation purposes (which includes channel estimation and frequency offset estimation). In particular, this would enable relaxed requirements on relative clock accuracy between points. Another advantage is that these techniques more fully exploit the benefits offered by the DM-RS estimator and the CSI-RS estimator.

Although the present technology has been described above with reference to specific embodiments, it is not intended to be limited to the specific form set forth herein. For example, the embodiments presented herein are not limited to PDSCH or ePDCCH; rather they are equally applicable to other appropriate physical downlink channels. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method used in a User Equipment (UE) for estimating a frequency offset between a Cell-specific Reference Signal (CRS) of a serving cell of the UE and a Demodulation-Reference Signal (DM-RS) of a data transmission to be decoded by the UE, using a set of quasi-co-located reference signals, the method comprising:
   comparing a number of Resource Blocks (RBs) for the data transmission to a first threshold, wherein the first threshold is a function of the number of DM-RS ports of the data transmission and/or of a Signal to Noise Ratio/Signal to Noise and Interference Ratio (SNR/SINR) level of the data transmission;
   selecting one or more quasi-co-located reference signals from the set of quasi-co-located reference signals based on a result of the comparison; and
   estimating the frequency offset based on the selected one or more quasi-co-located reference signals.

2. The method of claim 1, further comprising comparing a number of DM-RS ports for the data transmission to a second threshold, wherein the selected one or more quasi-co-located reference signals is selected further based on a result of the comparison of the number of DM-RS ports to the second threshold.

3. The method of claim 1, wherein the set of quasi-co-located reference signals includes:
   the DM-RS;
   Channel State Information Reference Signal (CSI-RS) that is quasi-co-located with the DM-RS with respect to the frequency offset; and
   CRS that is quasi-co-located with the DM-RS with respect to the frequency offset.

4. The method of claim 3, wherein the DM-RS is selected from the set of quasi-co-located reference signals when the number of RBs is larger than the first threshold.

5. The method of claim 4, wherein the CSI-RS is selected in addition to the DM-RS from the set of quasi-co-located reference signals when the number of RBs is larger than the first threshold.

6. The method of claim 3, wherein the CRS that is quasi-co-located with the DM-RS with respect to the frequency offset is selected from the set of quasi-co-located reference signals only when the number of RBs is smaller than or equal to the first threshold.

7. The method of claim 3, wherein the CSI-RS is selected from the set of quasi-co-located reference signals when the number of RBs is smaller than or equal to the first threshold.

8. The method of claim 7, wherein the DM-RS is used for resolving aliasing of the CSI-RS for frequency offsets larger than 100 Hz.

9. The method of claim 2, wherein the set of quasi-co-located reference signals includes:
   the DM-RS;
   Channel State Information Reference Signal (CSI-RS) that is quasi-co-located with the DM-RS with respect to the frequency offset; and
   CRS that is quasi-co-located with the DM-RS with respect to the frequency offset.

10. The method of claim 9, wherein when the number of RBs is larger than the first threshold and the number of DM-RS ports is smaller than the second threshold, the DM-RS is selected from the set of quasi-co-located reference signals, while the CRS, which is quasi-co-located with the DM-RS with respect to the frequency offset, is not selected.

11. The method of claim 10, wherein the CSI-RS is further selected from the set of quasi-co-located reference signals.

12. The method of claim 9, wherein when the number of RBs is larger than the first threshold and the number of DM-RS ports is larger than or equal to the second threshold, the CRS, which is quasi-co-located with the DM-RS with respect to the frequency offset, and/or the CSI-RS is selected from the set of quasi-co-located reference signals.

13. The method of claim 9, wherein when the number of RBs is smaller than or equal to the first threshold, the CRS, which is quasi-co-located with the DM-RS with respect to the frequency offset, and/or the CSI-RS is selected from the set of quasi-co-located reference signals.

14. The method of claim 2, wherein the second threshold is a function of the number of RBs of the data transmission and/or of a Signal to Noise Ratio/Signal to Noise and Interference Ratio (SNR/SINR) level of the data transmission.

15. A User Equipment (UE) for estimating a frequency offset between a Cell-specific Reference Signal (CRS) of a serving cell of the UE and a Demodulation-Reference Signal (DM-RS) of a data transmission to be decoded by the UE, using a set of quasi-co-located reference signals, the UE comprising a processing circuit configured to:
   compare a number of Resource Blocks (RBs) for the data transmission to a first threshold, wherein the first threshold is a function of the number of DM-RS ports of the data transmission and/or of a Signal to Noise Ratio/Signal to Noise and Interference Ratio (SNR/SINR) level of the data transmission;
   select one or more quasi-co-located reference signals from the set of quasi-co-located reference signals based on a result of the comparison; and
   estimate the frequency offset based on the selected quasi-co-located reference signals.

16. The UE of claim 15, wherein the processing circuit is further configured to compare a number of DM-RS ports for the data transmission to a second threshold and to select the selected one or more quasi-co-located reference signals further based on a result of the comparison of the number of DM-RS ports to the second threshold.

17. The UE of claim 15, wherein the set of quasi-co-located reference signals includes:
   the DM-RS;
   Channel State Information Reference Signal (CSI-RS) that is quasi-co-located with the DM-RS with respect to the frequency offset; and
   CRS that is quasi-co-located with the DM-RS with respect to the frequency offset.

18. The UE of claim 17, wherein the processing circuit is configured to select the DM-RS from the set of quasi-co-located reference signals when the number of RBs is larger than the first threshold.

19. The UE of claim 18, wherein the processing circuit is configured to select the CSI-RS in addition to the DM-RS from the set of quasi-co-located reference signals when the number of RBs is larger than the first threshold.

20. The UE of claim 17, wherein the processing circuit is configured to select the CRS that is quasi-co-located with the DM-RS with respect to the frequency offset from the set of quasi-co-located reference signals only when the number of RBs is smaller than or equal to the first threshold.

21. The UE of claim 17, wherein the processing circuit is configured to select the CSI-RS from the set of quasi-co-located reference signals when the number of RBs is smaller than or equal to the first threshold.

22. The UE of claim 21, wherein the DM-RS is used for resolving aliasing of the CSI-RS for frequency offsets larger than 100 Hz.

23. The UE of claim 16, wherein the set of quasi-co-located reference signals includes:
   the DM-RS;
   Channel State Information Reference Signal (CSI-RS) that is quasi-co-located with the DM-RS with respect to the frequency offset; and
   CRS that is quasi-co-located with the DM-RS with respect to the frequency offset.

24. The UE (1300) of claim 23, wherein the processing circuit is configured to select the DM-RS from the set of quasi-co-located reference signals, and not to select the CRS that is quasi-co-located with the DM-RS with respect to the frequency offset, when the number of RBs is larger than the first threshold and the number of DM-RS ports is smaller than the second threshold.

25. The UE (1300) of claim 24, wherein the processing circuit is configured to further select the CSI-RS from the set of quasi-co-located reference signals.

26. The UE of claim 23, wherein the processing circuit is configured to select the CRS that is quasi-co-located with the DM-RS with respect to the frequency offset and/or the CSI-RS from the set of quasi-co-located reference signals when the number of RBs is larger than the first threshold and the number of DM-RS ports is larger than or equal to the second threshold.

27. The UE of claim 23, wherein the processing circuit is configured to select the CRS that is quasi-co-located with the DM-RS with respect to the frequency offset, and/or the CSI-RS from the set of quasi-co-located reference signals when the number of RBs is smaller than or equal to the first threshold.

28. The UE according to claim 16, wherein the second threshold is a function of the number of RBs of the data transmission and/or of a Signal to Noise Ratio/Signal to Noise and Interference Ratio (SNR/SINR) level of the data transmission.

29. A UE for estimating a frequency offset between a Cell-specific Reference Signal (CRS) of a serving cell of the UE and a Demodulation-Reference Signal (DM-RS) of a data transmission to be decoded by the UE, the UE comprising:

a processor, and a memory including instructions which, when executed by said processor, cause said UE to:

compare a number of Resource Blocks (RBs) for the data transmission to a first threshold, wherein the first threshold is a function of the number of DM-RS ports of the data transmission and/or of a Signal to Noise Ratio/Signal to Noise and Interference Ratio (SNR/SINR) level of the data transmission;

select one or more quasi-co-located reference signals from the set of quasi-co-located reference signals based on a result of the comparison; and estimate the frequency offset based on the selected one or more quasi-co-located reference signals.

* * * * *